April 21, 1936.  A. G. H. FERGUSON ET AL  2,038,483
MANUFACTURE OF STEEL PIPES
Filed Feb. 1, 1933  2 Sheets-Sheet 2
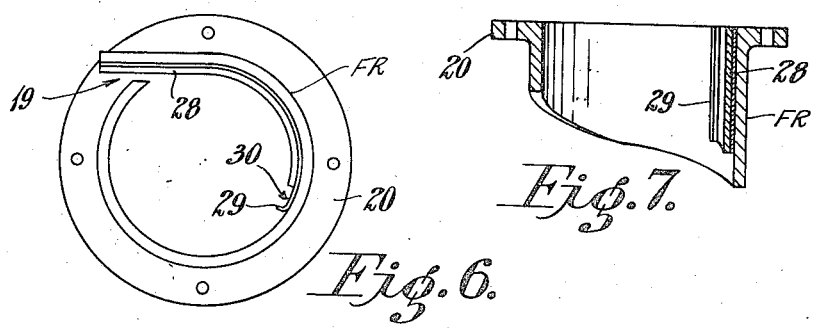
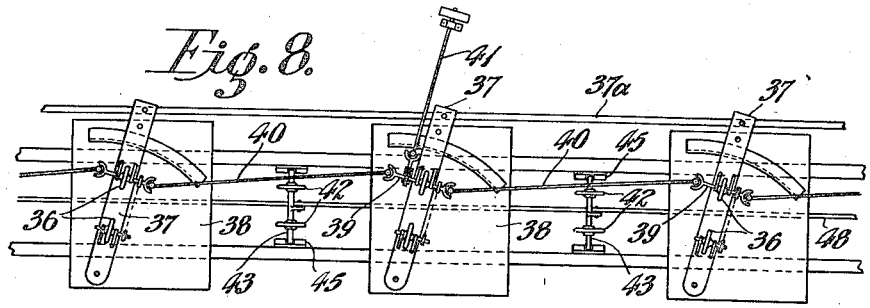
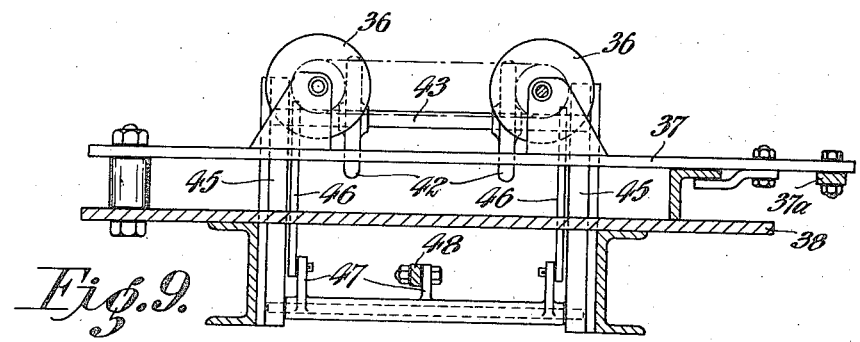
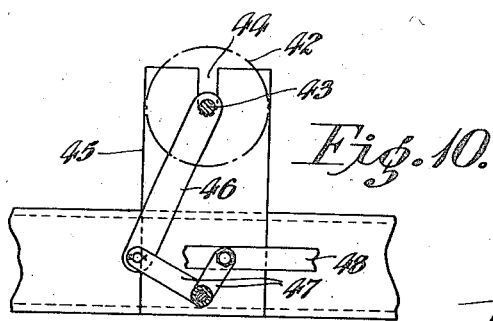
Inventors:
A. G. H. Ferguson
M. J. Ferguson
by E. F. Lundenoth
Atty.

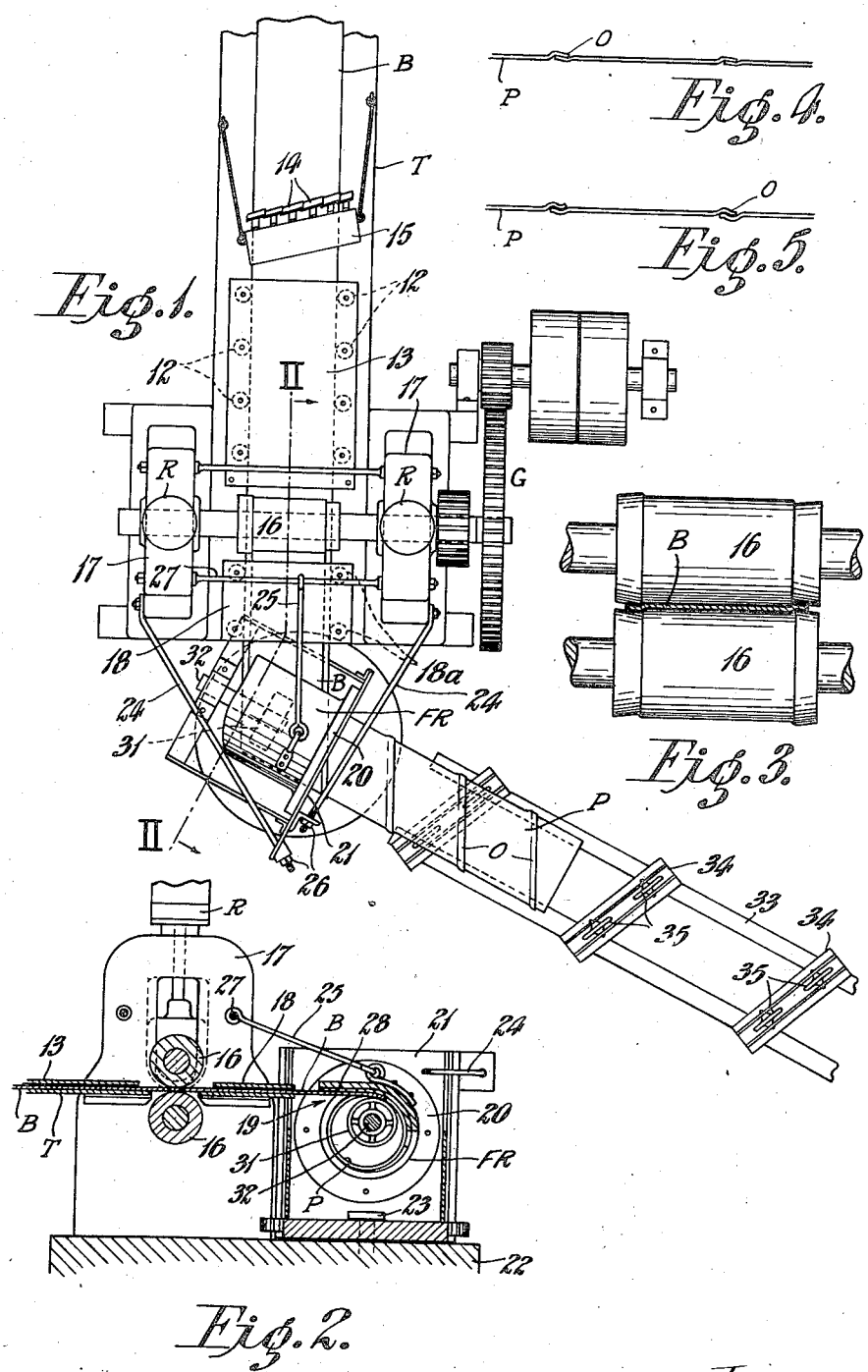

Patented Apr. 21, 1936

2,038,483

UNITED STATES PATENT OFFICE 2,038,483

MANUFACTURE OF STEEL PIPES

Albert George Hotham Ferguson and Mephan John Ferguson, Footscray, Victoria, Australia Application February 1, 1933, Serial No. 654,730
In Australia March 9, 1932

11 Claims. (Cl. 113—35)

The present invention refers to the production from heavy gauge steel plate of pipe of the class in which the plate is helically wound with the edges of the convolutions overlapped to form a continuous helically lapped joint, which joint is sealed by welding.

Heretofore it has been proposed to produce this class of pipe by means of bending rollers and welding of the lapped joint has been effected while the formation of the pipe takes place.

It has also been proposed to form tubular articles by helically winding strip metal with the edges of the convolutions beaded or interlocked, the strip being preformed at the edges for subsequent jointing after the helical winding operation in a coiling box.

According to the present invention the class of pipe mentioned is formed by feeding a strip of steel plate tangentially into a cylindrical forming ring through a longitudinally disposed entrant mouth in the latter to form the plate into a continuous and helically lapped pipe. The pipe so formed is then fed with helical progression past a welding head or heads which continuously and completely weld the lapped joint of the pipe. Force feed rollers are employed which feed the plate to and through the forming ring and cooperate with guide plates and edge rollers to control the plate.

The forming ring is mounted upon a platform or housing capable of rotary adjustment about a central vertical pivot whereby the pitch of the spiral produced by the forming ring can be varied to meet the requirements of differing diameters of pipes produced from plate of the same or differing widths.

The pivotal axis of the platform or housing will coincide with the vertical diametrical plant of the axis of the forming ring.

To secure smooth forming of the plate in the forming ring and to prevent any occurrence of "flats", a roller may be provided within the forming ring to support the underneath surface of the plate at a point approximately where bending of the latter commences in the forming ring. As the plate being formed into spiral form tends to unwind and thereby set up a high degree of frictional resistance to passage through the forming ring and heavy wear on the entire inner surface of the latter, the forming ring is devised to cause the plate entering same to be initially curved to an arc having a lesser radius than the ultimate radius of the curvature of the finished spiral form.

The extent to which the initial curvature mentioned is curved depends upon the elasticity or springiness of the plate and its ability after initial curvature is performed, to expand to the curvature required for the finished form.

The accompanying drawings depict inter alia, a practical application of the several features constituting the improvements before mentioned in the manufacture of steel pipes of the class specified.

In these drawings like parts bear like reference numerals.

In these drawings—

Fig. 1 is a plan view of the complete spiral pipe forming portion of the invention.

Fig. 2 is a vertical section on line II—II in Fig. 1.

Fig. 3 is an enlarged elevation of force feed rollers with "faucet" and "spigot" end forming formations.

Figs. 4 and 5 depict pipe longitudinal sections showing two forms of "faucet" and "spigot" formations in the overlap of the spiral.

Fig. 6 is an enlarged end elevation of the entrance mouth of the forming ring and—

Fig. 7 a transverse section of the latter.

Figs. 8 and 9 are a plan and a vertical section respectively of the supporting and spiral feeding mechanism for the formed pipe during the operation of continuous welding of the overlap.

Fig. 10 is an enlarged transverse section of a detail of vertically adjustable roller supporting mechanism.

The plate or blank B to be formed into a spiral pipe is supported upon a suitably arranged table pipe and prior to passing between edge guide rollers T and under overhead guide plate 13 may have the outer surface scraped, as by a set of inclined scraper plates at 14 rigidly trailing and held in position by a heavy support 15 to which the scraper plates are attached.

Proceeding beyond the edge guide rollers 12 and overhead guide plate 13, the plate is engaged by the force feed rollers 16 (see Fig. 3) which have the ends formed to set up a stepped faucet and spigot formation on the edges of the plate. The latter formation may set up an overlap as shown in Fig. 4 or as shown in Fig. 5, the latter having a greater degree of interlock of the overlap than the former.

The surfaces of the rollers 16 may be milled or slightly roughened to set up an increased gripping surface on the plate B. The feed rollers 16 are power driven by suitable driving mechanism as by the gearing shown at G and feed pressure applied as by overhead hydraulic rams R installed in the upper portion of the side members 17 as shown in Fig. 2.

After being forced through the feed rollers 16 the plate is held against lifting or buckling by a further overhead guide plate 18 and set of edge guide rollers 18a.

Arriving at the tangentially disposed cylindrical forming ring FR the plate P enters the mouth 19 and during its passage through said ring engages with the inner periphery of the latter and is curved into spiral form with overlap to constitute the pipe P. On account of the great resistance of the plate to curvature into spiral form in the forming ring FR the latter requires to be solidly anchored, and for this purpose is securely bolted by a flange 20 to the inner face of one member of the housing 21 as shown in Figs. 1 and 2.

The housing 21 has a base plate solidly held to a bed 22 by a substantial anchoring pin 23 (see Fig. 2).

In addition the housing 21 is rigidly stayed at its upper end by angularly disposed stay rods 24 to the side members 17 beforementioned.

The housing 21 carrying the forming ring FR is axially rotatable about the anchoring pin 23 by adjusting the length of the stay rods 24 by means of the terminal nuts 26 (see Fig. 1). This axial adjustment provides for variation of the pitch of the spiral produced by the forming ring FR carried in the housing 21 to meet requirements of differing diameters of pipes produced from plate of the same or differing width, the vertical center line of the anchoring pin 23 coinciding with vertical diametrical plane of the longitudinal axis of the forming ring FR.

To further anchor the forming ring FR, while permitting its rotation with its housing 21 about the anchoring pin 23, a stay rod 25, from a cross bar 27 rigidly secured to beforementioned side members 17, is pivotally connected to the forming ring (see Figs. 1 and 2) at a point in vertical alignment with the vertical center line of said anchoring pin 23 coinciding with vertical diametrical plane of the longitudinal axis of the forming ring FR.

At the entrance mouth to the forming ring FR an initial portion of the internal diameter of the latter is reduced in diameter as by insertion of a short liner 28 corresponding in curvature and fixed to said central portion whereby an initial curvature greater than the final curvature of the finished pipe is applied to the plate on entering said ring for the purpose before stated.

The degree of initial curvature as before stated is dependent upon the elastic factor of the plate to expand to the curvature required for the ultimate exterior diameter of the spiral form, which latter corresponds with the inner diameter of the forming ring FR ahead of said liner 28.

For example if the pipe being formed and made up of $\frac{3}{16}$ to $\frac{5}{16}$ of one inch thickness of plate is to have an ultimate exterior diameter of 18 inches a liner 28 can be employed which will approach up to one inch in thickness but this will vary according to the degree of hardness and elasticity of the plate.

At a short distance ahead of the inner edge of the liner 28 a scraper blade 29 is fitted (see Figs. 6 and 7) to clean up the curved surface of the plate contacting with the inner surface of the forming ring and assist in reducing friction on the latter.

By fitting the scraper blade 29 ahead of the liner 28 as above stated, a pocket 30 is formed to collect the scrapings which can be cleaned out when required and without stopping operations.

The roller 31 fitted in the entrance mouth of the forming ring FR supports the plate during initial curvature (see Fig. 2) and is carried on a spindle 32 (see Fig. 1) mounted on the upper face of housing 21.

The pipe emerging in helical progression from the forming ring FR is supported upon a rail platform 33 having angularly disposed parallel plates 34 on the upper surface carrying longitudinally aligned pairs of rollers 35 which contact with the exterior underneath surface of the pipe.

When the required length of pipe emerges from the forming ring, it is cut off and fed helically past one or more welding heads (not shown).

To effect such feed the pipe is supported on driven rollers 36 (similar to rollers 35) mounted on platforms 37 adjustably angularly disposed relative to the rail supported platforms 38 (see Figs. 8 and 9) carrying said platforms.

The platforms 37 are each pivoted at one end to a coupling bar 37a, reciprocal movement of the latter being used to adjust the angular disposition of said platforms and the rollers 36 carried thereon, with relation to the pipe supported by the latter. The spindles 39 of some of the rollers 36 are universally coupled by connecting rods 40 and said spindles are connected by chain drive as shown in Fig. 8 to the spindles of the remaining rollers 36. Power drive is applied to the said spindles 39 by a power shaft 41 universally connected to one of said spindles.

To lower the pipe into or raise it from contact with said driven rollers 36, sets of pairs of rollers 42 are provided between the platforms 37 and the spindles 43 of these rollers are free to be raised and lowered in slots 44 in supporting brackets 45. Simultaneous lowering and raising of these spindles is shown conveniently effected by links 46 connected to bell cranks 47 connected to a common actuating rod 48.

The rollers 42 are in the raised position when a pipe to be subjected to welding operations reaches the first of the rail supported platforms 38 and when welding is to be commenced by means of a suitably arranged overhead welding head or heads, the rollers 42 are lowered to cause the pipe to contact with and be supported and rotated with helical progression upon the driven rollers 36.

As before described the rollers 36 are arranged and the speed of rotation determined according to the pitch of the spiral of the pipe and the speed of welding.

We claim:—

1. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, said roller means having means thereon for placing a stepped formation along the edges of said plate, a concentric abutment on the inner surface of said forming ring for initially curving said plate at a smaller radius of curvature than the radius of the finished pipe and scraping means located spaced from and in advance of said concentric abutment to clean up the curved surface of said plate before contacting the inner surface of said forming ring and to assist in reducing friction upon said forming ring.

2. A mechanism for manufacturing a steel pipe from a plate comprising a supporting bed, a forming ring disposed at an angle to said bed associated with said bed, a single abutment consisting of a liner plate located in said forming ring and concentric thereto for initially curving said plate at a greater curvature than in the finished pipe and a scraper associated with said abutment.

3. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring and a single abutment consisting of a liner plate on the inner surface of said forming ring and concentric thereto for initially curving said plate at a smaller radius of curvature than the radius of the finished pipe.

4. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, said roller means having means thereon for placing a stepped formation along the edges of said plate and a single abutment consisting of a liner plate on the inner surface of said forming ring and concentric thereto for initially curving said plate at a smaller radius of curvature than the radius of the finished pipe.

5. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, said roller means being formed at the ends thereof to provide stepped formation in the edges of said plate and a single abutment consisting of a liner plate on the inner surface of said forming ring and concentric thereto for initially curving said plate at a smaller radius of curvature than the radius of the finished pipe.

6. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring and a single abutment consisting of a liner plate on the inner surface of said forming ring and concentric thereto extending into said mouth of said forming ring for initially curving said plate at a smaller radius of curvature than the radius of the finished pipe.

7. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, said roller means having means thereon for placing a stepped formation along the edges of said plate and a single abutment consisting of a liner plate on the inner surface of said forming ring and concentric thereto extending into said mouth of said forming ring for initially curving said plate at a smaller radius of curvature than the radius of the finished pipe.

8. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, said roller means being formed at the ends thereof to provide stepped formation in the edges of said plate and a single abutment consisting of a liner plate on the inner surface of said forming ring and concentric thereto extending into said mouth of said forming ring for initially curving said plate at a smaller radius of curvature than the radius of the finished pipe.

9. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring and a single abutment consisting of a liner plate on the inner surface of said forming ring and concentric thereto for initially curving said plate at a smaller radius of curvature than the radius of the finished pipe, and scraping means located spaced from and in advance of said concentric abutment to clean up the curved surface of said plate before contacting the inner surface of said forming ring and to assist in reducing friction upon said forming ring.

10. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, said roller means being formed at the ends thereof to provide stepped formation in the edges of said plate, a single abutment consisting of a liner plate on the inner surface of said forming ring and concentric thereto for initially curving said plate at a smaller radius of curvature than the radius of the finished pipe and a scraping means located spaced from and in advance of said concentric abutment to clean up the curved surface of said plate before contacting the inner surface of said forming ring and to assist in reducing friction upon said forming ring.

11. A mechanism for manufacturing from a plate a spiral steel pipe having overlapped edges comprising a supporting bed for said plate, a cylindrical forming ring located ahead of and disposed at an angle to said supporting bed having an entrant mouth longitudinally disposed therein, roller means for feeding a plate from said supporting bed to said mouth of said forming ring, a single abutment consisting of a liner plate on the inner surface of said forming ring and concentric thereto for initially curving said plate at a smaller radius of curvature than the radius of the finished pipe and a scraper plate located in advance of said concentric abutment and spaced therefrom thereby forming a pocket for collecting the scrapings.

ALBERT GEORGE HOTHAM FERGUSON.
MEPHAN JOHN FERGUSON.